United States Patent
Adachi et al.

(10) Patent No.: US 6,916,508 B2
(45) Date of Patent: Jul. 12, 2005

(54) METHOD OF COATING A PLASTIC MOLDING, ULTRAVIOLET-CURABLE UNDER COATING FOR METAL EVAPORATION, AND PLASTIC MOLDINGS

(75) Inventors: Yoichi Adachi, Daito (JP); Kazuhiko Takashima, Hirakata (JP); Akira Ushio, Hatogaya (JP); Sakae Matsui, Takatsuki (JP)

(73) Assignee: Nippon Paint Co., Ltd., Osaka (JP)

( * ) Notice: Subject to any disclaimer, the term of this patent is extended or adjusted under 35 U.S.C. 154(b) by 268 days.

(21) Appl. No.: 10/153,745

(22) Filed: May 24, 2002

(65) Prior Publication Data

US 2002/0193526 A1 Dec. 19, 2002

(30) Foreign Application Priority Data

May 25, 2001 (JP) ........................................ 2001-157819
May 25, 2001 (JP) ........................................ 2001-157820

(51) Int. Cl.$^7$ .............................. B05D 3/06; B05D 5/06; C09D 133/08
(52) U.S. Cl. ...................... 427/508; 427/512; 427/532; 525/193; 525/210; 525/214; 522/109; 522/121
(58) Field of Search ................................ 522/109, 110, 522/120, 121, 111, 112; 525/193, 210, 214; 427/508, 512, 532

(56) References Cited

U.S. PATENT DOCUMENTS

| | | | | |
|---|---|---|---|---|
| 3,485,775 A | * | 12/1969 | Cenci et al. ................. | 525/210 |
| 4,083,821 A | * | 4/1978 | Harris ........................ | 524/427 |
| 4,175,971 A | * | 11/1979 | Shinozaki et al. .......... | 430/287.1 |
| 4,649,082 A | * | 3/1987 | Friedlander ................. | 428/461 |
| 4,663,199 A | | 5/1987 | Liebler et al. | |
| 4,880,849 A | * | 11/1989 | Poole et al. ................. | 522/10 |
| 5,763,535 A | | 6/1998 | Adachi et al. | |
| 5,780,526 A | | 7/1998 | Matsui et al. | |
| 5,840,783 A | * | 11/1998 | Momchilovich et al. ..... | 522/112 |
| 6,146,002 A | | 11/2000 | Danapilis et al. | |
| 6,599,980 B2 | * | 7/2003 | Kim et al. ................... | 525/191 |

FOREIGN PATENT DOCUMENTS

| | | | |
|---|---|---|---|
| EP | 0 307 920 A2 | | 3/1989 |
| JP | 06279706 A | * | 10/1994 |
| JP | 7-26167 | | 1/1995 |
| WO | WO 95/32250 | | 11/1995 |

\* cited by examiner

Primary Examiner—Susan Berman
(74) Attorney, Agent, or Firm—Sughrue Mion, PLLC

(57) ABSTRACT

It is an object of the present invention to provide a method of coating a plastic molding which is appropriately applicable to various plastic substrates, an ultraviolet-curable under coating for metal evaporation, which is to be used in that method of coating, and a plastic molding obtained by that method of coating.

A method of coating a plastic molding comprising
  steps of applying an ultraviolet-curable under coating for metal evaporation to a plastic substrate,
  then subjecting the coated substrate to ultraviolet irradiation to form an under coating film,
  evaporating a metal on the coating film and
  applying a clear coating to the metal surface to form a clear coating film layer,
  wherein the ultraviolet-curable under coating for metal evaporation comprises an acrylic resin comprising, as a constituent, at least one monomer (a) selected from among dicyclopentanyl (meth)acrylate, dicyclopentenyl (meth)acrylate and isobornyl (meth)acrylate, a compound having at least two (meth)acryloyl groups within the molecule, and a photopolymerization initiator.

3 Claims, No Drawings

METHOD OF COATING A PLASTIC MOLDING, ULTRAVIOLET-CURABLE UNDER COATING FOR METAL EVAPORATION, AND PLASTIC MOLDINGS

TECHNICAL FIELD

The present invention relates to a method of coating a plastic molding, to an ultraviolet-curable under coating for metal evaporation which is to be used in the above method of coating, and a plastic molding obtained by that method.

BACKGROUND ART

Reflectors and the like of automobiles are produced by preparing corresponding moldings using various plastics, such as polypropylene and polycarbonates, and causing a metal, such as aluminum, to be vacuum-evaporated on the surface thereof. In such a case, however, if aluminum or the like metal is directly evaporated on the moldings made of plastics, the brightness of the metal is lost and those optical characteristics which are required of reflectors cannot be developed. Therefore, prior to metal evaporation, an under coating is applied in advance to the plastic surface and then cured to improve the optical characteristics. As the under coating to be used for such purposes, various ones are known, for example acrylic resin lacquers and nitrocellulose resin lacquers, urethane resin coatings and ultraviolet-curable coatings.

However, in applying these under coatings to plastic substrates, it is necessary to prepare different under coatings according to different plastics species. In other words, while these under coatings can suitably be applied to moldings made of plastics other than polypropylene, these under coatings, when applied to moldings made of polypropylene, can hardly develop a good adhesion between the substrates and under coatings and, therefore, another under coating for the exclusive application to moldings made of polypropylene must be prepared separately from these coatings. When such under coating for exclusive use is applied to moldings made of another plastic, for example a polycarbonate, the heat resistance decreases and the moldings cannot be used suitably as automotive reflectors and the like.

Meanwhile, an ultraviolet-curable liquid under coating composition for metal evaporation on FRPs which comprises a polyfunctional acrylate of dipentaerythritol and an isocyanurate form polyisocyanate is described in Japanese Kokai Publication Hei-07-26167, and an ultraviolet-curable liquid under coating composition for metal evaporation on FRPs, which comprises a compound having at least two (meth)acryloyl groups within the molecule, an oil-modified alkyd resin and a photopolymerization initiator is described in WO 95/32250. By applying these liquid compositions, as under coatings, to the surface of FRP (fiber-reinforced composite material) materials, it is intended to improve the adhesion to FRP materials, the heat resistance and the water resistance.

However, it is unknown whether these liquid compositions are adequately applicable to various plastics such as polypropylene, polycarbonates, polyethylene terephthalate, polybutylene terephthalate and acrylonitrile-butadiene-styrene copolymers. Therefore, the advent of a curable under coating for metal evaporation which is appropriately applicable to moldings made of various plastics and is excellent in adhesion to substrates and can give product moldings excellent in heat resistance, and a method of coating a plastic molding using that coating, for example a coating method suited for use in producing automotive reflectors or the like made of various plastic substrates, has been demanded.

SUMMARY OF THE INVENTION

In view of the above-mentioned state of the art, it is an object of the present invention to provide a method of coating a plastic molding which is appropriately applicable to various plastic substrates, an ultraviolet-curable under coating for metal evaporation, which is to be used in that method of coating, and a plastic molding obtained by that method of coating.

The present inventors made investigations in search of a method of coating a plastic molding and an ultraviolet-curable under coating for metal evaporation which is to be used in that method of coating and, in the course of the investigations, they first noticed that an ultraviolet-curable under coating for metal evaporation which comprises an acrylic resin comprising, as a constituent, at least one monomer selected from among dicyclopentanyl (meth)acrylate, dicyclopentenyl (meth)acrylate and isobornyl (meth)acrylate, a compound having at least two (meth)acryloyl groups within the molecule, and a photopolymerization initiator can suitably be applied to moldings made of various plastics, is excellent in adhesion to substrates and gives product moldings excellent in heat resistance. And, they found that a particular method of coating is suited for use as a method of coating various plastic moldings. Said particular method of coating comprises steps of subjecting the above ultraviolet-curable under coating for metal evaporation as applied to various plastic substrates to ultraviolet irradiation for curing, allowing a metal, such as aluminum, to be evaporated on the thus-obtained under coating films and further applying a clear coating to the evaporated metal to form a clear coating film layer.

They also found that when the ultraviolet-curable under coating for metal evaporation which is to be used in the above method of coating a plastic molding comprises a specific amount of an acrylic resin comprising, as constituents thereof, at least one monomer selected from among dicyclopentanyl (meth)acrylate, dicyclopentenyl (meth) acrylate and isobornyl (meth)acrylate and another polymerizable unsaturated monomer and having a specific glass transition temperature (Tg) and a specific solubility parameter (SP value), a specific amount of a compound having at least two (meth)acryloyl groups within the molecule and, further, a chlorinated polyolefin and a photopolymerization initiator, the coating is excellent in adhesion to substrates and the moldings obtained are excellent in heat resistance. They further found that the plastic moldings obtained by the above-mentioned method of coating a plastic molding are excellent in heat resistance and therefore suited for use as automotive reflectors and the like. Based on these findings, the present invention has now been completed.

The present invention relates to a method of coating a plastic molding comprising steps of applying an ultraviolet-curable under coating for metal evaporation to a plastic substrate, then subjecting the coated substrate to ultraviolet irradiation to form an under coating film, evaporating a metal on the coating film and applying a clear coating to the metal surface to form a clear coating film layer, wherein the ultraviolet-curable under coating for metal evaporation comprises an acrylic resin comprising, as a constituent, at least one monomer (a) selected from among dicyclopentanyl (meth)acrylate, dicyclopentenyl (meth)acrylate and isobornyl (meth)acrylate, a compound having at least two (meth)acryloyl groups within the molecule, and a photopolymerization initiator.

The present invention also relates to an ultraviolet-curable under coating for metal evaporation which comprises 20 to 70% by weight of an acrylic resin comprising 30 to 90% by weight of at least one monomer (a) selected from among dicyclopentanyl (meth)acrylate, dicyclopentenyl (meth)acrylate and isobornyl (meth)acrylate and 10 to 70% by weight of another polymerizable unsaturated monomer (b) as constituents and having a glass transition temperature (Tg) of 100 to 200° C. and a solubility parameter (SP value) of 7.0 to 9.5, 30 to 80% by weight of a compound having at least two (meth)acryloyl groups within the molecule and 0.05 to 10% by weight of a chlorinated polyolefin and 2 to 15% by weight of a photopolymerization initiator, each based on the total weight of the acrylic resin and the compound having at least two (meth)acryloyl groups within the molecule.

The invention further relates to a plastic molding obtained by the above method of coating.

DETAILED DISCLOSURE OF THE INVENTION

In the following, the present invention is described in detail.

The method of coating a plastic molding according to the invention comprises steps of applying a curable under coating for metal evaporation to a plastic substrate, then subjecting the coated substrate to ultraviolet irradiation to form an under coating film, allowing a metal to be evaporated on that coating film and further applying a clear coating to the resulting metal layer to form a clear coating film layer.

First, the under coating to be used in the method of coating a plastic molding according to the invention is described.

The first component to be contained in the under coating in the method of coating a plastic molding according to the invention is an acrylic resin comprising, as a constituent, at least one monomer (a) selected from among dicyclopentanyl (meth)acrylate, dicyclopentenyl (meth)acrylate and isobornyl (meth)acrylate.

The above acrylic resin is obtained by homopolymerizing at least one monomer (a) selected from among dicyclopentanyl (meth)acrylate, dicyclopentenyl (meth)acrylate and isobornyl (meth)acrylate or by copolymerizing a monomer composition comprising at least one monomer (a) selected from among dicyclopentanyl (meth)acrylate, dicyclopentenyl (meth)acrylate and isobornyl (meth)acrylate and at least one other polymerizable unsaturated monomer (b).

Preferred as the above-mentioned at least one monomer (a) selected from among dicyclopentanyl (meth)acrylate, dicyclopentenyl (meth)acrylate and isobornyl (meth)acrylate is isobornyl (meth)acrylate, since a high glass transition temperature (Tg) can be attained and the heat resistance of the resulting moldings can be increased.

In describing the present invention, "(meth)acrylate" means "acrylate or methacrylate". Thus, for example, isobornyl (meth)acrylate among the above (a) components means isobornyl acrylate or isobornyl methacrylate.

As the above other polymerizable unsaturated monomer (b), there may be mentioned, for example, alkyl (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, pentyl (meth)acrylate, hexyl (meth)acrylate, heptyl (meth)acrylate, cyclohexyl (meth)acrylate, n-octyl (meth)acrylate and 2-ethylhexyl (meth)acrylate; hydroxyl-containing polymerizable unsaturated monomers such as 2-hydroxyethyl (meth)acrylate, hydoxypropyl (meth)acrylate, 2,3-dihydroxybutyl (meth)acrylate, 4-hydroxybutyl (meth)acrylate and polyethylene glycol mono(meth)acrylate; compounds obtained by ring opening polymerization of ε-caprolactone on the above-mentioned hydroxyl-containing polymerizable unsaturated monomers, for example hydroxyl-containing polymerizable unsaturated monomers given the names "Placcel FA-1", "Placcel FA-2", "Placcel FA-3", "Placcel FA-4", "Placcel FA-5", "Placcel FM-1", "Placcel FM-2", "Placcel FM-3", "Placcel FM-4" and "Placcel FM-5" (trademarks, all being products of Daicel Chemical Industries); carboxyl-containing polymerizable unsaturated monomers such as (meth)acrylic acid, maleic acid, fumaric acid and itaconic acid; epoxy group-containing polymerizable unsaturated monomers such as glycidyl (meth)acrylate and 3,4-epoxycyclohexylmethyl (meth)acrylate; aminoalkyl-containing polymerizable unsaturated monomers such as N,N-dimethylaminoethyl (meth)acrylate, N,N-diethylaminoethyl (meth)acrylate and N,N-dimethylaminopropyl (meth)acrylate; (meth)acrylamide or derivatives thereof, such as acrylamide, methacrylamide, N,N-dimethylaminoethyl(meth)acrylamide, N,N-diethylamioethyl(meth)acrylamide, N,N-dimethylaminopropyl(meth)acrylamide, N-methylolacrylamide, N-methylolacrylamide methyl ether and N-methylolacrylamide butyl ether; acrylonitrile, methacrylonitrile, vinyl acetate, VeoVa monomers (products of Shell Chemical), vinyltoluene, α-methylstyrene and styrene and like polymerizable unsaturated monomers. These compounds may be used singly or two or more of them may be used in combination.

In the under coating of the present invention, the proportions of the respective monomers constituting the acrylic resin are preferably within the ranges mentioned below, with the total of all constituent monomers being taken as 100% by weight.

The proportion of the above-mentioned at least one monomer (a) selected from among dicyclopentanyl (meth)acrylate, dicyclopentenyl (meth)acrylate and isobornyl (meth)acrylate is preferably within the range of 30 to 90% by weight. When that proportion is selected within this range, the appearance and other properties of product coating films become good. A more preferred range is 35 to 85% by weight. The proportion of the above-mentioned other alkyl (meth)acrylate (b) is preferably within the range of 10 to 70% by weight. By selecting that proportion within this range, it becomes possible to attain good finish as well as good adhesion after water resistance test. A more preferred range is 15 to 65% by weight.

From the viewpoint of adhesion to substrates, the above acrylic resin preferably has an acid value of not more than 5 mg KOH/g and a hydroxyl value of not more than 5 and, in particular, it preferably has substantially no functional group. The absence of any functional group makes it possible to lower the solubility parameter (SP value) of the acrylic resin and to secure the adhesion to plastic materials such as polypropylene.

The above-mentioned acrylic resin preferably has a number average molecular weight (Mn) of 7,000 to 30,000, more preferably 9,000 to 25,000. When it is below the lower limit, the crosslinkability required of coatings may lower, hence the adhesion to substrates may decrease. When it is above the upper limit, the coating operation may become difficult and/or the appearance may be deteriorated.

In describing the present invention, the number average molecular weight is determined by gel permeation chromatography (GPC) and by using a working curve constructed using standard polystyrene species.

Further, the above acrylic resin preferably has a glass transition temperature (Tg) of 100 to 200° C., more preferably 120 to 180° C., still more preferably 130 to 170° C. When the Tg is lower than the lower limit, the appearance of the moldings obtained is deteriorated after heat resistance testing, whereas those resins having a Tg higher than the upper limit are difficult to obtain on an industrial scale.

Further, the above acrylic resin preferably has a solubility parameter (SP value) of 7.0 to 9.5, more preferably 7.5 to 9.2. When the SP value is lower than the lower limit, the moldings obtained are low in heat resistance and, in addition, those having a SP value lower than the lower limit are difficult to produce on an industrial scale. When it is above the upper limit, the adhesion to substrates decreases.

The method of polymerizing the above monomer components to produce the desired acrylic resin is not particularly restricted but includes known methods of polymerization, for example bulk polymerization, solution polymerization and bulk-suspension two-step polymerization, which comprises bulk polymerization followed by suspension polymerization, each carried out in the presence of a radical polymerization initiator. Solution polymerization can suitably be used, among others.

In carrying out the above polymerization method, it is preferred that the polymerization initiator be used in an increased amount and/or the polymerization time be prolonged, since when monomer components, in particular at least one monomer (a) selected from among dicyclopentanyl (meth)acrylate, dicyclopentenyl (meth)acrylate and isobornyl (meth)acrylate, remain in the acrylic resin obtained, the initial adhesion of the moldings obtained may possibly be decreased. Specifically, the polymerization initiator is preferably used in an amount of not less than 0.5 part by weight, more preferably 1 to 5 parts by weight, per 100 parts by weight of the monomer components and is generally added dropwise in two or three divided portions. The polymerization time is preferably about 2 to 5 hours in total. From the viewpoint of preventing monomers from remaining, it is also possible to raise the polymerization reaction temperature, although care should be taken so that the number average molecular weight of the product acrylic resin may not become unduly small. A temperature of 75 to 120° C. is preferred as the polymerization reaction temperature.

In the practice of the present invention, the under coating preferably contains the above-mentioned first component, namely the acrylic resin, in an amount of 20 to 70% by weight based on the total amount of that resin and the second component to be mentioned later herein, namely a compound having at least two (meth)acryloyl groups within the molecule. When the amount is less than 20% by weight, the adhesion to substrates and the heat resistance and other performance characteristics of the moldings obtained will become poor. When it exceeds 70% by weight, the curability and the physical properties of coating films may become poor. An amount of 30 to 60% by weight is more preferred.

The second component to be contained in the under coating to be used in the method of coating a plastic molding according to the present invention is a compound having at least two (meth)acryloyl groups within the molecule. Upon ultraviolet irradiation, the compound having at least two (meth)acryloyl groups within the molecule polymerizes under the action of the photopolymerization initiator and is cured and contributes to the formation of under coating films.

As the compound having at least two (meth)acryloyl groups within the molecule, there may be mentioned, for example, (1) products obtained by reacting a polyol with (meth)acrylic acid, (2) urethane acrylates obtained by adding a hydroxyl- and (meth)acryloyl-containing compound to a compound having terminal isocyanato groups within the molecule and (3) epoxy acrylates obtained by reacting a compound having at least two epoxy or glycidyl groups within the molecule with (meth)acrylic acid.

The above-mentioned products (1) obtained by reacting a polyol with (meth)acrylic acid are oligoester acrylates. The above polyol includes, among others, polyols such as ethylene glycol, diethylene glycol, triethylene glycol, propylene glycol, dipropylene glycol, polyethylene glycol, trimethylene glycol, polypropylene glycol, tetramethylene glycol, polytetramethylene glycol, 1,2-butanediol, 1,3-butanediol, 1,4-butanediol, 1,5-pentanediol, neopentyl glycol, 1,2-hexylene glycol, 1,6-hexanediol, heptanediol, 1,10-decanediol, cyclohexanediol, 2-butene-1,4-diol, 3-cyclohexene-1,1-dimethanol, 4-methyl-3-cyclohexene-1,1-dimethanol, 3-methylene-1,5-pentanediol, (2-hydroxyethoxy)-1-propanol, 4-(2-hydroxyethoxy)-1-butanol, 5-(2-hydroxyethoxy)pentanol, 3-(2-hydroxypropoxy)-1-butanol, 4-(2-hydroxypropoxy)-1-butanol, 5-(2-hydroxypropoxy)-1-pentanol, 1-(2-hydroxyethoxy)-2-butanol, 1-(2-hydroxyethoxy)-2-pentanol, hydrogenated bisphenol A, glycerol, diglycerol, polycaprolactone, 1,2,6-hexanetriol, trimethylolpropane, trimethylolethane, pentanetriol, trishydroxymethylaminomethane, 3-(2-hydroxyethoxy)-1,2-propanediol, 3-(2-hydroxypropoxy)-1,2-propanediol, 6-(2-hydroxyethoxy)-1,2-hexanediol, 1,9-nonanediol, neopentyl glycol hydroxypivalate, spiroglycol, 2,2-bis(4-hydroxyethoxyphenyl)propane, 2,2-bis(4-hydroxypropyloxyphenyl)propane, pentaerythritol, dipentaerythritol, trimethylolpropane, trishydroxyethyl isocyanurate, di(2-hydroxyethyl)-1-acetoxyethyl isocyanurate, di(2-hydroxyethyl)-2-acetoxyethyl isocyanurate, mannitol and glucose and, further, alkylene oxide-modified or lactone-modified polyols obtained by subjecting ethylene oxide, propylene oxide, ε-caprolactone, γ-butyrolactone and the like to addition reaction with the polyols mentioned above as well as hydroxyl-terminated polyester polyols, polyether polyols and the like, which are obtained by condensing the above polyols used in excess with a polybasic acid or the acid anhydride thereof.

The above polybasic acid or an acid anhydride thereof is not particularly restricted but includes, for example, phthalic acid, isophthalic acid, terephthalic acid, trimellitic acid, methylcyclohexenetricarboxylic acid, adipic acid, sebacic acid, azelaic acid, tetrahydrophthalic acid, hexahydrophthalic acid, himic acid, succinic acid, dodecynylsuccinic acid, methylglutaric acid, pimelic acid, malonic acid, maleic acid, fumaric acid, chloromaleic acid, dichloromaleic acid, citraconic acid, mesaconic acid, itaconic acid, tetrahydrophthalic acid, carbic acid, het acid, aconitic acid, glutaconic acid, and acid anhydrides thereof.

As the above polyol, there may further be mentioned reaction products from a compound having at least two epoxy or glycidyl groups within the molecule and a univalent acid or amine, for instance.

The compound having at least two epoxy or glycidyl groups within the molecule is not particularly restricted but includes, among others, glycidyl ether type epoxy resins derived from bisphenol A, bisphenol F, 2,6-xylenol, brominated bisphenol A, phenol novolak and o-cresol novolak; glycidyl ester type epoxy resins derived from dimer acid and so on; aromatic or heterocyclic amine-derived glycidyl ester type epoxy resins; alicyclic epoxy resins; epoxy or glycidyl group-containing acrylic resins; and the like.

The above glycidyl ether type epoxy resins also include, for example, glycerol triglycidyl ether, trimethylolpropane triglycidyl ether, sorbitol tetraglycidyl ether, sorbitol pentaglycidyl ether, sorbitan tetraglycidyl ether, sorbitan pentaglycidyl ether, triglycerol tetraglycidyl ether, tetraglycerol tetraglycidyl ether, pentaglycerol tetraglycidyl ether, triglycerol pentaglycidyl ether, tetraglycerol pentaglycidyl ether, pentaglycerol pentaglycidyl ether, pentaerythritol tetraglycidyl ether and triglycidyl isocyanurate.

The above univalent acid is not particularly restricted but includes, among others, acetic acid, propionic acid, benzoic acid, lauric acid, stearic acid, butyric acid, (meth)acrylic acid and the like.

The above univalent amine is not particularly restricted but includes, among others, monoethylamine, diethylamine, triethylamine, isopropylamine, diisopropylamine, mono-n-butylamine, di-n-butylamine, tri-n-butylamine, mono-2-ethylhexylamine, monobenzylamine, piperidine, morpholine, n-methylmorpholine, N-ethylmorpholine and cetylmorpholine.

Referring to the urethane acrylates (2) obtained by adding a hydroxyl- and (meth)acryloyl-containing compound to a compound having terminal isocyanato groups within the molecule, there may be mentioned, for example, polyisocyanates and reaction products from the polyols specifically mentioned above referring to compound (1) and a polyisocyanate as the above compound having terminal isocyanato groups within the molecule.

When the reaction product from a compound having at least two epoxy or glycidyl groups within the molecule and a univalent acid or amine is used as the polyol in preparing the compounds (2), the products are obtained as ester bond- and urethane bond-containing urethane-modified epoxy acrylates, for example by reacting a compound having one isocyanato group in each molecule as obtained by reacting in advance a compound having one hydroxyl and one (meth)acryloyl group within the molecule with a polyisocyanate with a polyol obtained by reacting a compound having at least two epoxy or glycidyl groups within the molecule with a univalent acid or amine.

The polyisocyanate mentioned above referring to compound (2) may be, for example, an aliphatic, alicyclic, aromatic or aromatic-aliphatic one and, as such, there may be mentioned, among others, diisocyanates such as tolylene diisocyanate, 4,4'-diphenylmethanediisocyanate, xylylene diisocyanate, hexamethylene diisocyanate, lysine diisocyanate, 4,4'-methylenebis(cyclohexyl isocyanate), methylcyclohexane-2,4-diisocyanate, methylcyclohexane-2,6-diisocyanate, 1,3-(isocyanatomethyl)cyclohexane, isophoronediisocyanate, trimethylhexamethylene diisocyanate, dimer acid diisocyanate, dianisidinediisocyanate, phenyl diisocyanate, halogenated phenyl diisocyanate, methylene diisocyanate, ethylene diisocyanate, butylene diisocyanate, propylene diisocyanate, octadecylene diisocyanate, 1,5-naphthalenediisocyanate, polymethylenepolyphenylene diisocyanate, triphenylmethanetriisocyanate, naphthylene diisocyanate, 3-phenyl-2-ethylene diisocyanate, cumene-2,4-diisocyanate, 4-methoxy-1,3-phenylene diisocyanate, 4-ethoxy-1,3-phenylene diisocyanate, 2,4'-diisocyanatodiphenyl ether, 5,6-dimethyl-1,3-phenylene diisocyanate, 4,4'-diisocyanatodiphenyl ether, benzidinediisocyanate, 9,10-anthracenediisocyanate, 4,4'-diisocyanatodibenzyl, 3,3-dimethyl-4,4'-diisocyanatodiphenyl, 2,6-dimethyl-4,4'-diisocyanatodiphenyl, 3,3-dimethoxy-4,4'-diisocyanatodiphenyl, 1,4-anthracenediisocyanate, phenylene diisocyanate, 1,4-tetramethylene diisocyanate, 1,10-decanemethylene diisocyanate and 1,3-cyclohexylene diisocyanate; nurates, biurets and adducts of these diisocyanates; and triisocyanates such as 2,4,6-tolylene triisocyanate and 2,4,4'-triisocyanatodiphenyl ether.

As the hydroxyl- and (meth)acryloyl-containing compound mentioned above referring to compound (2), there may be mentioned, for example, pentaerythritol tri(meth) acrylate, dipentaerythritol penta(meth)acrylate, epoxy (meth)acrylate, 2-hydroxyethyl (meth)acrylate, glycerol di(meth)acrylate, and alkylene oxide-modified or lactone-modified compounds derived from these compounds by addition of ethylene oxide, propylene oxide, ε-caprolactone, γ-butyrolactone or the like. Use may further be made of compounds derived from these compounds by addition of a polyisocyanate.

The compounds (3) obtained by reacting a compound having at least two epoxy or glycidyl groups within the molecule and (meth)acrylic acid are epoxy acrylates.

As the compound having at least two epoxy or glycidyl groups within the molecule, there may be mentioned, for example, those given hereinabove as examples of the compound (1) having at least two epoxy or glycidyl groups within the molecule.

The above-mentioned compounds (1) to (3), among others, can be used as the compound having at least two (meth)acryloyl groups within the molecule in the under coating of the present invention, and these compounds are ultraviolet-cured owing to the polymerization reaction involving the unsaturated bonds contained therein. Where necessary, the under coating of the invention can further contain another compound having unsaturated bonds, for example diallyl fumarate, triallyl isocyanurate or the like.

In the under coating of the invention, the content of the second component, namely the compound having at least two (meth)acryloyl groups within the molecule is preferably 30 to 80% by weight based on the total amount of that compound and the first component acrylic resin. When it is less than 30% by weight, the luster and heat resistance become poor and, when it exceeds 80% by weight, the adhesion to substrates decreases. A more preferred content range is 40 to 70% by weight.

Among the above-mentioned compounds having at least two (meth)acryloyl groups within the molecule, those compounds which have at least four (meth)acryloyl groups within the molecule, in particular, are preferably used in an amount of not less than 40% by weight based on the total amount of (meth)acryloyl group-containing compounds from the viewpoint of coating film curability and water resistance. Further, the use thereof in an amount of not less than 50% by weight results in improvements in performance characteristics of coating films.

The third component to be contained in the under coating in the method of coating a plastic molding according to the invention is a photopolymerization initiator.

The photopolymerization initiator is not particularly restricted but includes, for example, benzoin methyl ether, benzoin ethyl ether, benzoin isobutyl ether, benzoin isopropyl ether, benzoin, α-methylbenzoin, benzoin n-butyl ether, 2-ethylanthraquinone, 2-tert-butylanthraquinone, 1-chloroanthraquinone, 2-amylanthraquinone, 2-aminoanthraquinone, benzophenone, p-chlorobenzophenone, p-dimethylaminobenzophenone, benzophenone methyl ether, methylbenzophenone, 4,4-dichlorobenzophenone, 4,4-bisdiethylaminobenzophenone, diphenyl sulfide, tetramethylthiuram disulfide, 2,4-dimethylthioxanthone, 2,4-diisopropylthioxanthone, 2,4-diethylthioxanthone, 2-chlorothioxanthone, 2-isopropylthioxanthone, 2,2-dimethoxy-2-phenylacetophenone, α,α-dichloro-4-phenoxyacetone, p-tert-butyltrichloroacetophenone, p-tert-butyldichloroacetophenone, 2,2-diethoxyacetophenone, p-dimethylaminoacetophenone, hydroxycyclohexyl phenyl ketone, 1-(4-isopropylphenyl)-2-hydroxy-2-methylpropane-1-one, 2,2-dimethoxy-1,2-diphenylethane-1-one, 2,4,6-trimethylbenzoin diphenylphosphine oxide, 2-methyl-1-[4-(methylthio)phenyl]-2-morpholinopropane-1-one, 4-(2-acryloxy)oxyethoxy-phenyl 2-hydroxy-2-propyl ketone, 4-(2-hydroxy)phenyl-(2-hydroxy-2-propyl) ketone, bis(2,6-dimethoxybenzoyl)-2,4,4-trimethylphenylphosphine oxide, etc. Among these, benzophenone, 2-ethylanthraquinone, 2,4-dimethylthioxanthone, 2,4-diisopropylthioxanthone, 2,4-diethylthioxanthone, 2-chlorothioxanthone, 2-isopropylthioxanthone, hydroxycyclohexyl phenyl ketone, 1-(4-isopropylphenyl)-2-hydroxy-2-methylpropane-1-one and 2,2-dimethoxy-1,2-diphenylethane-1-one are preferred because of good curability, adhesion and heat resistance. In the practice of the invention, one or two or more of them can be used singly or in combination in the under coating.

In the practice of the present invention, the under coating preferably contains the above photopolymerization initiator in an amount of 2 to 15% by weight based on the total amount of the acrylic resin and the compound having at least two (meth)acryloyl groups within the molecule. If the content is less than 2% by weight, the adhesion and heat resistance become inferior. A content exceeding 15% by weight is economically disadvantageous although the effects remain unchanged. A more preferred content range is 3 to 10% by weight.

The under coating to be used in the method of coating a plastic molding according to the present invention preferably contains, in addition to the above first, second and third components, a chlorinated polyolefin as a fourth component.

Addition of the above-mentioned chlorinated polyolefin to the under coating to be used in the practice of the present invention can result in improved adhesion to substrates. In particular, good adhesion can be provided to other olefin substrates such as polypropylene.

In the practice of the invention, the under coating preferably contains 0.05 to 10% by weight, more preferably 0.05 to 1% by weight, of the above chlorinated polyolefin based on the total amount of the acrylic resin and the compound having at least two (meth)acryloyl groups within the molecule. When the content exceeds the upper limit, the storage stability of the coating decreases and, when it is below the lower limit, insufficient adhesion to substrates may result.

In cases where the under coating according to the invention contains a chlorinated polyolefin, the chlorinated polyolefin is not particularly restricted but there may be mentioned, for example, one or more species selected from among chlorinated polypropylene and derivatives of chlorinated polypropylene as obtained by grafting of maleic anhydride.

The method of grafting maleic anhydride onto chlorinated polypropylene is not particularly restricted but use may be made, for example, of those products produced by melting and mixing up chlorinated polypropylene and maleic anhydride in the presence of a peroxide to thereby cause grafting of maleic anhydride onto chlorinated polypropylene. The reaction temperature for this reaction can be selected within the range of 180 to 2500° C., for instance. The rate of grafting of maleic anhydride is preferably 0.01 to 1 mol/L.

When the under coating to be used in the practice of the present invention contains such maleic anhydride-grafted polypropylene, the maleic anhydride-grafted polypropylene may be a commercial product generally available on the market. As such commercial product, there may be mentioned Toyo Kasei Kogyo's Hardlen 14ML (trademark) and Nippon Pulp's Superchlone 306, for instance.

When the under coating to be used in the practice of the invention contains a maleic anhydride-grafted polypropylene resin, the base polypropylene resin for the maleic anhydride-grafted polypropylene resin may be any of ordinary polypropylene resins, such as polypropylene homopolymers, ethylene-propylene block copolymers, ethylene-propylene random copolymers and other copolymers.

By using the under coating of the present invention, it becomes possible to attain firmer adhesion of evaporated metals to substrates. While the reason why better adhesion can be attained as compared with the prior art is unknown, it is presumable that, in particular when the under coating contains maleic anhydride-grafted polypropylene, the melt viscosity of the coating is low on the occasion of adhesion, hence adhesion becomes possible.

In the practice of the present invention, a solvent, a surface modifier and so forth may further be added to the under coating.

The solvent dilutes the under coating according to the invention and facilitates the application thereof. The solvent to be used is not particularly restricted but preferably is one low in surface tension so that the hiding power may be increased. As such, there may be mentioned alcohol solvents, and ketone solvents such as methyl isobutyl ketone. In addition to these, ethyl acetate, butyl acetate, toluene, xylene and the like may be used in combination in view of the rate of vaporization and the cost. The level of addition of the solvent can be increased or decreased according to need.

The above-mentioned surface modifier is not particularly restricted but includes fluorine-containing additives, for example. The fluorine-containing additives lower the surface tension and increase the hiding power to thereby prevent the cratering from occurring upon application to various plastic materials. As specific examples of the fluorine-containing additives, there may be mentioned Megafac F-177 (trademark, product of Dainippon Ink and Chemicals) and the like.

As for the level of addition of the surface modifier in the under coating of the invention, the above fluorine-containing additive, when used as the modifier, is preferably used in an amount of 0.01 to 1.0 part by weight per 100 parts by weight of the total of the above-mentioned four components, namely the first, second, third and fourth components.

The plastic substrate to which the method of coating a plastic molding according to the invention can be applied is not particularly restricted but includes, for example, polypropylene, polycarbonates, polyethylene terephthalate, polybutylene terephthalate, acrylonitrile-butadiene-styrene copolymers, acrylonitrile-styrene copolymers, polyphenylene oxide, polybutylene terephthalate-polyethylene terephthalate composite materials and polycarbonate-polyethylene terephthalate composite materials. As specific examples, there may be mentioned, among others, automotive reflectors of headlamps, taillamps, sidelamps and the like. The method of coating a plastic molding according to the invention can be applied not only to the above-mentioned automotive reflectors and the like but also to toys, daily necessaries and so forth. When applied to toys, daily necessaries or the like, the method can produce decorative effects.

In accordance with the method of coating a plastic molding according to the present invention, the plastic substrate is, for example, washed with isopropyl alcohol or a like aqueous washing agent, and the under coating according to the invention is then applied to the surface of the substrate, followed by ultraviolet irradiation to form an under coating film.

The above application can be carried out in the manner of air spray coating, electrostatic coating, dip coating, etc. Air spray coating is preferred, however.

The above application is carried out to give a dry film thickness of 10 to 40 µm and, prior to the above-mentioned ultraviolet irradiation, the solvent can be vaporized by preheating at 60 to 130° C. for 2 to 25 minutes, preferably 3 to 20 minutes. If the dry film thickness is less than 10 µm, the substrate cannot be hidden but film dewetting may occur. When it exceeds 40 µm, the reflected image sharpness decreases and, further, unevenness, sags and other troubles may occur in the step of coating. If the above preheating temperature is below 60° C., the water resistance and heat resistance will be poor. A temperature exceeding 130° C. will not affect the performance characteristics but is economically disadvantageous. When the preheating time is shorter than 2 minutes, the solvent vaporization may be insufficient while a longer time exceeding 25 minutes may be economically disadvantageous.

The above ultraviolet irradiation can be carried out, after the above preheating, under the conditions of about 500 to 5,000 mJ. The under coating according to the invention can be cured by the above ultraviolet irradiation. When the irradiation is carried out at below 500 mJ, the under coating may not be cured sufficiently. Irradiation at above 5,000 mJ cannot produce effects proportional to the high energy, hence means a waste of energy.

In carrying out the ultraviolet irradiation, those high-pressure mercury lamps, metal halide lamps and other lamps which are generally used in the art can be used. High-pressure mercury lamps are preferred, however.

After application and curing of the under coating of the invention, a metal, for example aluminum, is vacuum-evaporated on the cured coating film and, further, a clear coating is applied onto the evaporated metal for corrosion prevention thereof. After baking at 40 to 120° C. for about 5 to 25 minutes, a clear coating film layer (topcoat layer) can be formed with a dry film thickness of 2 to 15 µm. When the baking temperature is below 40° C. or the baking time is shorter than 5 minutes, the adhesion to substrates may decrease. When the baking temperature is above 120° C. or the baking time is longer than 25 minutes, economical disadvantages may result. A dry film thickness less than 2 µm may fail to hide the substrate but may discontinuous. With a film thickness exceeding 15 µm, the reflected image sharpness may decrease and, further, unevenness, sags and other troubles may result in the step of application.

As the clear coating to be used in the above clear coating process, there may be mentioned, among others, acrylic lacquer coatings, acrylic melamine-curing system clear coatings and aluminum chelate-curing type acrylic coatings.

The under coating to be used in the method of coating a plastic molding according to the present invention is excellent in adhesion to various plastic substrates and in heat resistance, so that the plastic moldings obtained by that method are excellent in heat resistance and are particularly suited for use in those applications where heat resistance is demanded, for example automotive reflectors.

The method of coating a plastic molding and the ultraviolet-curable under coating for metal evaporation, both provided by the present invention, can suitably be applied to various plastic substrates, and the plastic moldings obtained are excellent in adhesion and heat resistance. For example, automotive reflectors obtained by the method of coating a plastic molding and the ultraviolet-curable under coating for metal evaporation according to the invention are excellent in appearance and heat resistance, hence are suited for use as such. Furthermore, when they are applied to toys and daily necessaries, for instance, it is also possible to provide the same with decorative effects.

BEST MODES FOR CARRYING OUT THE INVENTION

The following examples illustrate the present invention more specifically. However, these examples are by no means limitative of the scope of the present invention. In the examples, "part(s)" means "part(s) by weight" unless otherwise specified.

Reference Example

Toluene (336 g) was placed in a reaction flask and heated to 90° C. in a nitrogen gas atmosphere. A mixture containing 70 g of monomeric styrene (ST), 140 g of methyl methacrylate (MMA), 140 g of isobornyl methacrylate (IBOMA), 3.5 g of tertiary butyl peroxide as a photopolymerization initiator and 7 g of toluene as a solvent was placed in a dropping funnel and added dropwise into the reaction flask over 3 hours. Thereafter, the mixture was stirred for 1 hour and 30 minutes and then a mixed solution of 7 g of toluene and 0.7 g of tertiary butyl peroxide was added dropwise from a dropping funnel into the flask over 30 minutes. After further 1 hour and 30 minutes of stirring, the flask was cooled. An acrylic resin (704 g, acrylic resin 1) was obtained.

The monomers specified in Table 1 were reacted as formulated under the same conditions as in the case of acrylic resin 1 and the products were designated as acrylic resins 2 to 8. In Table 1, "dicyclopentanyl" indicates "dicyclopentanyl methacrylate" and "dicyclopentenyl" indicates "dicyclopentenyl methacrylate". IBOA indicates isobornyl acrylate.

The Tg and SP values of the thus-obtained acrylic resins 1 to 8 are shown in Table 1. The Tg and SP values are values calculated based on the respective monomer compositions used. The acid values and hydroxyl values of acrylic resins 1 to 8 were each equal to 0.

Examples 1 to 14 and Comparative Examples 1 to 3

In the respective Examples and Comparative Examples, ultraviolet-curable under coatings for plastics for metal evaporation were prepared by compounding the respective components specified in Table 1 according to the formulations given in parts by weight in Table 1. In Comparative Example 1, monomeric isobornyl methacrylate was used in lieu of the acrylic resin.

In Table 1, Aronix M-402 (product of Toagosei Chemical Industry, dipentaerythritol hexaacrylate) was used as the (meth)acrylate having 6 (meth)acryloyl groups within the molecule (hereinafter, that the number of (meth)acryloyl groups contained in the molecule is 6, for instance, is referred to as "hexafunctional", and similar notations are used). The tetrafunctional (meth) acrylate used was Aronix M-408 (product of Toagosei Chemical Industry, ditrimethylolpropane tetraacrylate), the trifunctional (meth)acrylate used was Aronix M-309 (TMPTA) (product of Toagosei Chemical Industry, trimethylolpropane triacrylate), and the bifunctional (meth)acrylate used was Aronix M-220 (TPGDA) (product of Toagosei Chemical Industry, tripropylene glycol diacrylate), Aronix M-1600 (product of Toagosei Chemical Industry, urethane acrylate) or Epoxy Ester 70PA (product of Kyoeisha, propylene glycol diglycidyl ether diacrylate).

Hardlen 14ML was used as the chlorinated polyolefin. 2-ethylanthraquinone or benzophenone was used as the photopolymerization initiator. Megafac F-177 (product of Dainippon Ink and Chemicals, perfluoroalkyl group-containing nonionic oligomer) was used as the surface modifier. Toluene and methyl isobutyl ketone were used as the solvent.

Production of Plastic Parts with an Evaporated Metal Layer Thereon

A plate (2×5 cm) cut out from the plane portion of a polypropylene (PP)-made automotive lamp substrate for metal evaporation was washed with isopropyl alcohol (IPA) and, after drying, one of the ultraviolet-curable under coatings for plastics for metal evaporation as obtained in the above-mentioned manner was applied to the surface thereof to achieve a dry film thickness of 15 μm by air spray coating. Thereafter, the solvent was removed by preheating at 80° C. for 5 minutes, the film was cured by ultraviolet irradiation at a dose of 1,500 mJ using a 80 W/cm ozone type diffusion type high pressure mercury lamp, whereby an under coating film was formed on the plastic substrate surface. Then, aluminum was vacuum-evaporated on the surface of the under coating film obtained and, further thereonto, a clear coating (top coating) (UVI Coat 90K-31, product of Nippon Paint, aluminum chelate-curing type acrylic coating) was applied to achieve a dry film thickness of 3 μm by air spray coating, followed by baking at 60° C. for 20 minutes to form a clear coating film layer (top coat layer). In this manner, plastic parts with an evaporated metal layer were produced.

TABLE 1

| | | | Mn | Tg | SP | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|---|---|
| Acrylic resin | 1 | IBOMA/MMA/ST = 40/40/20 | 14100 | 131 | 9.0 | — | — | — | — | — | — | — | — |
| | 2 | IBOMA/MMA/ST = 50/30/20 | 16400 | 138 | 8.7 | 40 | — | — | — | — | — | — | — |
| | 3 | IBOMA/MMA/ST = 60/20/20 | 16800 | 145 | 8.4 | — | 40 | — | — | — | — | — | — |
| | 4 | IBOMA/MMA/ST = 70/10/20 | 16000 | 153 | 8.0 | — | — | 40 | 40 | 40 | 40 | 40 | 40 |
| | 5 | IBOMA/MMA/ST = 80/10/10 | 16100 | 162 | 7.9 | — | — | — | — | — | — | — | — |
| | 6 | IBOMA/dicyclopentanyl/MMA/ST = 65/5/10/20 | 15900 | 152 | 8.1 | — | — | — | — | — | — | — | — |
| | 7 | IBOMA/dicyclopentenyl/MMA/ST = 65/5/10/20 | 16000 | 153 | 8.2 | — | — | — | — | — | — | — | — |
| | 8 | IBOA/MMA/ST = 60/20/20 | 15700 | 97 | 8.4 | — | — | — | — | — | — | — | — |
| IBOMA monomer | | | | 180 | 7.6 | — | — | — | — | — | — | — | — |
| Compound having at least two (meth)acryloyl groups within the molecule | | M-402 (Hexafunctional) | | | | — | — | — | 60 | — | — | — | — |
| | | M-408 (Tetrafunctional) | | | | 60 | 60 | 60 | — | 20 | 20 | 20 | 20 |
| | | M-309 (TMPTA, Trifunctional) | | | | — | — | — | — | 40 | — | — | — |
| | | M-220 (TPGDA, Bifunctional) | | | | — | — | — | — | — | 40 | — | — |
| | | M-1600 (Bifunctional) | | | | — | — | — | — | — | — | 40 | — |
| | | Epoxy Ester 70PA (Bifunctional) | | | | — | — | — | — | — | — | — | 40 |
| Photopolymerization initiator | | Benzophenone | | | | 4 | 4 | 4 | 4 | 4 | 4 | 4 | 4 |
| | | 2-Ethylanthraquinone | | | | 3 | 3 | 3 | 3 | 3 | 3 | 3 | 3 |
| Additive | | Hardlen 14 ML (chrorinated polyolefin) | | | | 0.1 | 0.1 | 0.1 | 0.1 | 0.1 | 0.1 | 0.1 | 0.1 |
| | | Megafac F-177 (surface modifier) | | | | 0.2 | 0.2 | 0.2 | 0.2 | 0.2 | 0.2 | 0.2 | 0.2 |

| | | | Ex. 9 | Ex. 10 | Ex. 11 | Ex. 12 | Ex. 13 | Ex. 14 | Compar. Ex. 1 | Compar. Ex. 2 | Compar. Ex. 3 |
|---|---|---|---|---|---|---|---|---|---|---|---|
| Acrylic resin | 1 | IBOMA/MMA/ST = 40/40/20 | — | — | — | 30 | — | — | — | — | — |
| | 2 | IBOMA/MMA/ST = 50/30/20 | — | — | — | — | — | — | — | — | — |
| | 3 | IBOMA/MMA/ST = 60/20/20 | — | — | — | — | — | — | — | — | — |
| | 4 | IBOMA/MMA/ST = 70/10/20 | 30 | 50 | — | — | — | — | — | — | 40 |
| | 5 | IBOMA/MMA/ST = 80/10/10 | — | — | 60 | — | — | — | — | — | — |
| | 6 | IBOMA/dicyclopentanyl/MMA/ST = 65/5/10/20 | — | — | — | — | 40 | — | — | — | — |
| | 7 | IBOMA/dicyclopentenyl/MMA/ST = 65/5/10/20 | — | — | — | — | — | 40 | — | — | — |
| | 8 | IBOA/MMA/ST = 60/20/20 | — | — | — | — | — | — | — | 40 | — |
| IBOMA monomer | | | — | — | — | — | — | — | 30 | — | — |
| Compound having at least two (meth)acryloyl groups within the molecule | | M-402 (Hexafunctional) | — | — | 40 | 70 | — | — | — | 60 | — |
| | | Compound having M-408 (Tetrafunctional) | 70 | 50 | — | — | 60 | 60 | 70 | — | 60 |
| | | M-309 (TMPTA, Trifunctional) | — | — | — | — | — | — | — | — | — |
| | | M-220 (TPGDA, Bifunctional) | — | — | — | — | — | — | — | — | — |
| | | M-1600 (Bifunctional) | — | — | — | — | — | — | — | — | — |
| | | Epoxy Ester 70PA (Bifunctional) | — | — | — | — | — | — | — | — | — |
| Photopolymerization initiator | | Benzophenone | 4 | 4 | 4 | 4 | 4 | 4 | 4 | 4 | 4 |
| | | 2-Ethylanthraquinone | 3 | 3 | 3 | 3 | 3 | 3 | 3 | 3 | 3 |
| Additive | | Hardlen 14 ML (chrorinated polyolefin) | 0.1 | 0.1 | 0.1 | 0.1 | 0.1 | 0.1 | 0.1 | 0.1 | — |
| | | Megafac F-177 (surface modifier) | 0.2 | 0.2 | 0.2 | 0.2 | 0.2 | 0.2 | 0.2 | 0.2 | 0.2 |

In the same manner, plastic parts with an evaporated metal layer were produced from substrates made of a polycarbonate (PC), polyethylene terephthalate (PET), polybutylene terephthalate (PBT), an acrylonitrile-butadiene-styrene (ABS) copolymer, an acrylonitrile-styrene (AS) copolymer, a polybutylene terephthalate-polyethylene terephthalate (PBT-PET) composite material or polyphenylene oxide (PPO).

Performance Tests/Evaluation Methods

The thus-obtained plastic parts with an evaporated metal layer were tested and evaluated for the following performance characteristics. The results are shown in Table 2.

plastic material species, then taken out from the oven, cooled to room temperature and evaluated for the appearance and adhesion by the same methods as mentioned above. When the material was polypropylene, the test was performed at 110° C. for 24 hours; polycarbonate—at 130° C. for 24 hours; polyethylene terephthalate—at 140° C. for 24 hours; polybutylene terephthalate—at 160° C. for 24 hours; acrylonitrile-butadiene-styrene copolymer—at 90° C. for 96 hours; acrylonitrile-styrene copolymer—at 100° C. for 24 hours; polybutylene terephthalate-polyethylene terephthalate composite material—at 160° C. for 24 hours; and polyphenylene oxide—at 150° C. for 24 hours.

TABLE 2

| | | | | Ex. | | | | | | | | | | | | | | Compar. Ex. | | |
|---|---|---|---|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 13 | 14 | 1 | 2 | 3 |
| Plastic material | PP | Initial | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 4 | 4 | 5 | 5 | 5 | 5 | 4 | 4 | 4 | 5 | 2 | 5 | 2 |
| | | After heat resistance test | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | — | 5 | — |
| | PC | Initial | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | | After heat resistance test | Appearance | 5 | 5 | 5 | 5 | 4 | 4 | 5 | 5 | 5 | 5 | 5 | 5 | 5 | 5 | 5 | 3 | 5 |
| | | | Adhesion | 5 | 5 | 5 | 5 | 5 | 5 | 5 | 5 | 5 | 5 | 5 | 5 | 5 | 5 | 5 | 5 | 5 |
| | PET | Initial | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | | After heat resistance test | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | PBT | Initial | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | | After heat resistance test | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | ABS | Initial | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | | After heat resistance test | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | AS | Initial | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | | After heat resistance test | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | PBT-PET | Initial | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | | After heat resistance test | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | PPO | Initial | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |
| | | After heat resistance test | Appearance | 5 | 5 | 5 | 5 | 5 | 5 | 5 | 5 | 5 | 5 | 5 | 5 | 5 | 5 | 5 | 5 | 5 |
| | | | Adhesion | 5 | 5 | 5 | 5 | 5 | 5 | 5 | 5 | 5 | 5 | 5 | 5 | 5 | 5 | 5 | 5 | 5 |

1. Coating Film Appearance

The appearance was observed by the eye for the absence or occurrence of iridescence, whitening, cracking, blistering and other defects. When there was no defect and, in particular, the luster was good, a score of 5 was given; no defect—4; slightly defective—3; evidently defective—2; severely defective—1.

2. Adhesion

Each plastic part with an evaporated metal layer was subjected to grid pattern cutting using a cutter knife to form 100 squares with a width of 2 mm. An adhesive cellophane tape was affixed on the surface thereof and then rapidly peeled off. Squares remaining unpeeled were counted. When 100/100 remained, a score of 5 was given; 99/100 to 95/100—4; 95/100 to 50/100—3; 49/100 to 25/100—2; 24/100 or less—1.

3. Heat Resistance

Each plastic part with an evaporated metal layer was allowed to stand in a hot air circulating drying oven at a specified temperature for a specified period according to the plastic material species, then taken out from the oven, cooled to room temperature and evaluated for the appearance and adhesion by the same methods as mentioned above.

As is evident from Table 2, the plastic parts with an evaporated metal layer obtained by the method of coating a plastic molding according to the invention using the ultraviolet-curable under coating for metal evaporation were found to be excellent not only in initial appearance and adhesion but also in appearance and adhesion after heat resistance testing.

What is claimed is:

1. An ultraviolet-curable under coating composition for metal evaporation,
wherein said ultraviolet-curable under coating composition comprises 20 to 70% by weight of an acrylic resin comprising 30 to 90% by weight of at least one monomer (a) selected from the group consisting of dicyclopentanyl (meth)acrylate, dicyclopentenyl (meth)acrylate and isobornyl (meth)acrylate and 10 to 70% by weight of another polymerizable unsaturated monomer (b) as constituents and having a glass transition temperature (Tg) of 100 to 200° C. and a solubility parameter (SP value) of 7.0 to 9.5, 30 to 80% by weight of a compound having at least two (meth)acryloyl groups within the molecule, and 0.05 to 10% by weight of a chlorinated polyolefin and 2 to 15% by weight of a photopolymerization initiator, each based on the total weight of the acrylic resin and the compound having at least two (meth)acryloyl groups within the molecule.

2. The ultraviolet-curable under coating composition for metal evaporation according to claim 1, wherein said ultraviolet-curable under coating composition comprises fluorine-containing additives.

3. A method of coating a plastic molding comprising steps of applying an ultraviolet-curable under coating composition for metal evaporation accoridng to claim 1 to a plastic substrate, then subjecting the coated substrate to ultraviolet irradiation to form an under coating film, evaporating a metal on the coating film and applying a clear coating to the metal surface to form a clear coating film layer.

* * * * *